United States Patent [19]

Jayne

[11] 3,778,760

[45] Dec. 11, 1973

[54] INTEGRATED FLIGHT INDICATORS
[76] Inventor: Murray L. Jayne, 8609 Lakeshore Dr., Kenosha, Wis. 53140
[22] Filed: June 17, 1971
[21] Appl. No.: 154,120

[52] U.S. Cl............................ 340/27 NA, 250/231 R
[51] Int. Cl.............................................. B64d 43/00
[58] Field of Search.................... 340/27 R, 27 AT, 340/27 NA; 250/231 R, 8.14, 8.16; 73/178 R, 178 T, 384; 33/351

[56] References Cited
UNITED STATES PATENTS
3,331,200  7/1967  Byron et al. .................... 250/231 R
2,337,535  12/1943  Acs, Jr. ............................ 20/231 R
R22,704   12/1945  Mosely............................ 340/27 NA
2,142,602  1/1939  Blethen ............................ 250/231 R
2,329,715  9/1943  Grier................................ 250/231 X Primary Examiner—Kathleen H. Claffy
Assistant Examiner—Thomas L. Kundert
Attorney—Emerson B. Donnell

[57]  ABSTRACT
This disclosure relates to an arrangement to be used in conjunction with spaced instruments whereby the indications of one of the instruments may be in effect superposed on another instrument while all of the instruments remain unimpaired and entirely readable and usable at all times in their intended manner.

8 Claims, 4 Drawing Figures

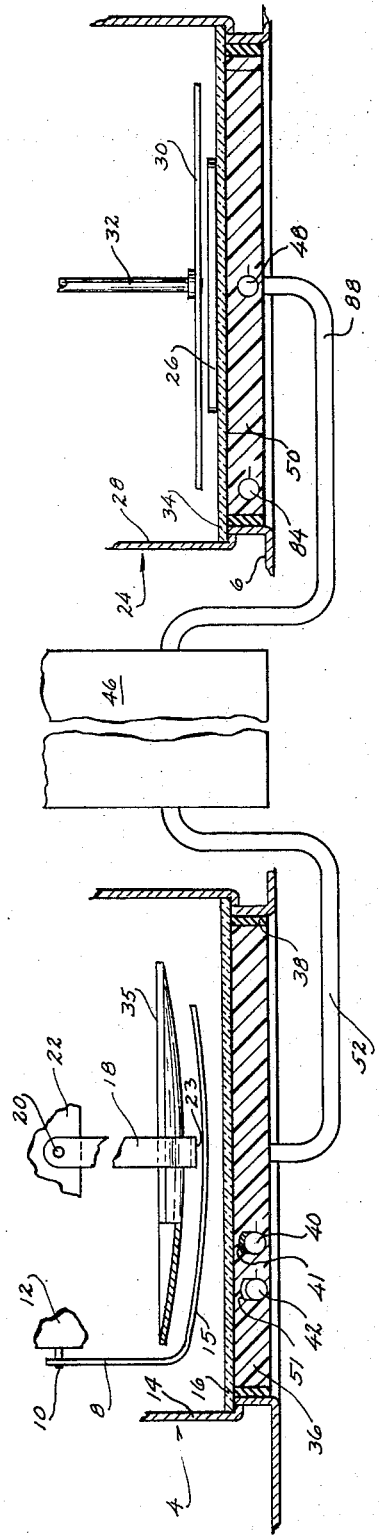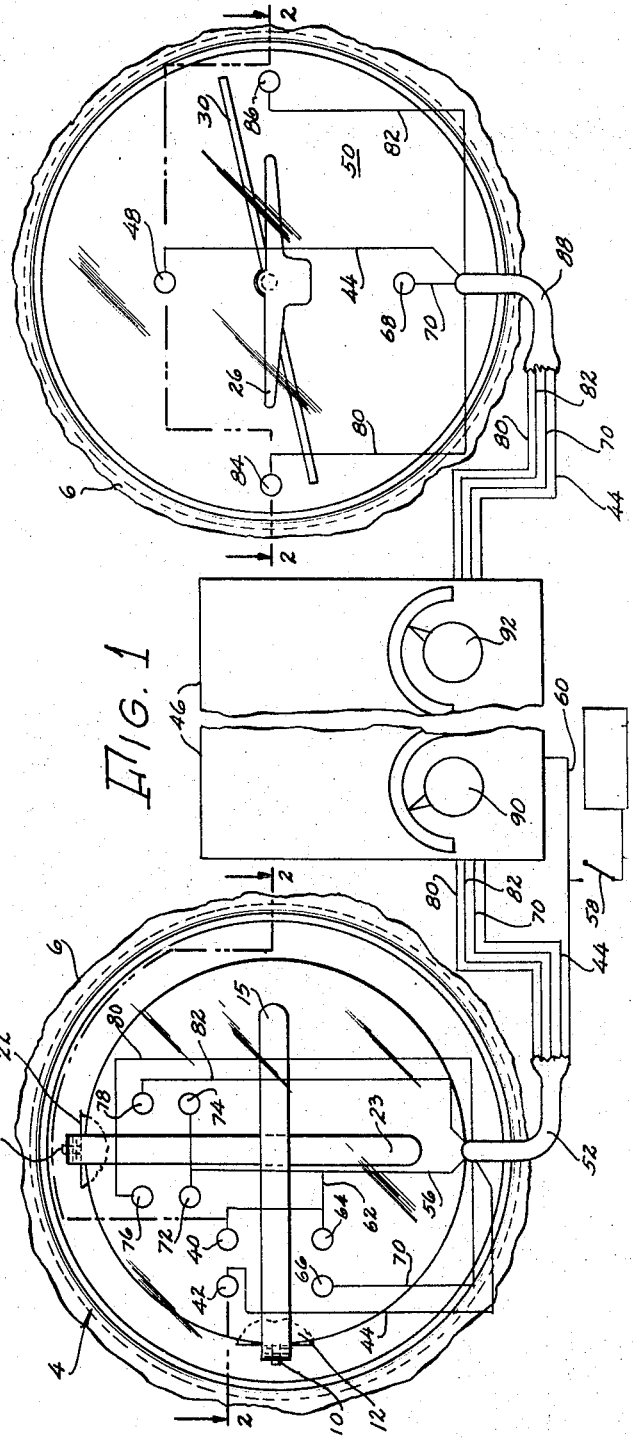

INVENTOR
MURRAY L. JAYNE
BY
Emerson B Donnell
ATTY.

INTEGRATED FLIGHT INDICATORS

While large aircraft are equipped with a number of very sophisticated instruments for flight control, blind or instrument landing etc., smaller planes are commonly supplied with two (among others), the combination glide-slope and localizer, and the attitude indicator, these being sufficient for nearly all conditions likely to be encountered by a small or light plane. In making a landing when the ground is not visible it is necessary to scan the dials of these two instruments continuously to make sure that the plane, on the one hand, is on the landing beam, and that the wings, on the other hand, are level. Commonly these two instruments are separated on the instrument panel and appreciable distance by reason of space requirements of the mechanism behind the indicating dials, mere convenience, etc., and there is a tendency for the pilot to concentrate on one instrument to the neglect of the other. Accordingly it is the principal object of the invention to provide an arrangement for application to instruments of this type and which will in effect superpose the indications of any one or more of the instruments on one of the instruments so that all of the indications of the several instruments will appear in one place, and may be observed together.

It is a further object of the invention to provide such an arrangement which, when in use with the hereinbefore mentioned instruments, will still provide for observation and unrestricted use of said instruments in the manner for which they were designed.

A further object is to provide an arrangement which will respond to indications of one of said instruments while providing complete freedom of movement of all movable parts of said instrument so as to avoid any possible impairment of the operation of said instrument.

A further and supplemental object is to provide an arrangement of the above type in the form of an attachment applicable to existing spaced instruments as aforesaid with a minimum amount of preparation or alteration of the instruments or their supports, such application consisting essentially in supplying means for supporting the elements of the attachment in place and accomodating the necessary wiring.

Further objects and advantages will appear from the following specification and accompanying drawings, in which:

FIG. 1 is a front elevation, diagrammatic in character, of an integrated flight indicator applied to a pair of spaced instruments as installed in an aircraft;

FIG. 2 is a cut-away top view of the same in section on the line 2—2 of FIG. 1;

FIG. 3 is a view similar to FIG. 1, partly in perspective of a modification; and FIG. 4 is a partial horizontal sectional view on the line 4—4 of FIG. 3.

In FIGS. 1 and 2 of the drawings, 4 is a well-known type of glide-slope indicator and localizer installed in the instrument panel 6 of an aircraft, and having a glide-slope indicator needle 8 supported on a pivot pin 10, in the disclosed embodiment carried in a support 12 spaced backwardly in a casing 14, the needle 8 extending forwardly and having a right angled index portion 15 observable through a transparent dial-panel or crystal 16. Indicator 4 also has a localizer needle 18 supported on a pivot pin 20, also spaced backwardly, carried by a support 22 and having a right angled index portion 23 observable through crystal 16. Needles 8 and 18 are swingable about pivot pins 10 and 20 by known mechanism within supports 12 and 22 in response to signals from the ground, and are particularly useful to a pilot when making the blind landing, as in the dark or especially in fog. Thus in following a radio landing beam, if the plane is too low, index 15 will move upwardly — if the plane is too high it will move downwardly. In similar manner, if the plane is off the beam to the left, index 23 will move toward the right — if the plane is off the beam to the right, it will move to the left. Thus by watching index portions 15 and 23 and correcting the course of the plane so as to keep them centered, the plane can be brought accurately down the landing beam to a safe landing.

It is noted that index portions 15 and 23 appear to intersect. Actually, one is spaced slightly in front of the other as shown in FIG. 2, index 15 being in front of index 23, their spacing and paths of travel being such that neither will interfere with the other.

As stated, this instrument is common equipment even on small light planes.

Another instrument common on small planes is the attitude indicator generally designated as 24, characterized by a representation of a small plane 26 fixed in a casing 28, and a horizon-line bar or needle 30 carried on a pivot 32 for swinging in an upright plane, and controlled by a gyroscope or other suitable or known mechanism not shown so that it remains level regardless of banking or tilting of the aircraft in which the instrument is installed. Thus as the airaft banks toward one side or the other, and which might not be apparent to the pilot if he could not see the ground, and accordingly had no frame of reference, the little plane in the instrument appears to bank in the same direction in relation to bar 30, which, as stated, remains horizontal, and the pilot is able to trim his ship by watching the small plane and controlling the aircraft to keep the small plane level in relation to bar 30, the latter having at one time become known as the "artificial horizon".

Instrument 24 is enclosed by a dial crystal 34.

As will be apparent, when a landing is being made it is important, both that the aircraft be on the beam, so as to hit the desired landing spot, and that the wings be level, since if they are not the aircraft is probably flying in a curve, and may not be aligned with the runway when touchdown occurs. Accordingly it is necessary to monitor both of these instruments 4 and 24 continuously during the landing approach. Unfortunately they are seldom installed close to each other, for reasons of lack of space, accommodation of other instruments, etc., and it is impossible to give these two instruments the undivided attention they should have while shifting the eye continually from one to the other. It is therefore highly desirable that the pilot be relieved of the necessity of continually looking from one instrument to the other, and when necessity is eliminated by the present invention.

Such instruments are commonly sealed at the factory, and in any event attachment of any kind of electrical connections within the instruments would be likely to be inconvenient in many cases, although it is within the contemplation of the invention to provide a glide-slope and localizer indicator having internal connections which may be utilized to actuate the auxiliary indicator to be presently described. While such an indicator and its connections might be preferred, an arrangement will now be described in which no direct internal or external connections are needed, and which is especially desirable in installations where access to the electrical connections is difficult or inconvenient.

In glide-slope indicator 4 index portions 15 and 23 are commonly strips or ribbons of polished metal or phosphorescent material of appreciable width, and they move in front of a dial 35 fixed in a casing 14 and of a dark color, usually dead black, to avoid annoying reflections. In the present arrangement a transparent overlay 36 is secured in front of crystal 16 in any suitable or convenient manner, in the illustrated embodiment by being pressed into the opening in panel 6 provided for viewing instrument 4, a yielding or rubber-like bushing 38 being interposed to give a satisfactory and dependable friction grip. Another way would be to attach overlay 36 to crystal 16 with transparent cement. At a location slightly above index 15 overlay 36 has a light source 40 preferably directed inwardly toward dial 35 and including a lense portion 41 positioned to concentrate the light from light source 40 on index 15. Also in overlay 36 is a photosensitive diode or cell 42, close to light source 40 and so positioned that, when index 15 is displaced upwardly, light from source 40 will be intercepted by index 15 and reflected by the index back through crystal 16 and overlay 36 into cell 42. The latter will then promptly send an electrical impulse or current through a lead or connection 44 into a power transmission means including an amplifier 46 of known type whereupon the current, now much stronger, will continue to a lamp or similar light emitting unit 48 disposed in an overlay 50 secured in front of the face of instrument 24 and crystal 34 thereof, preferably in a manner similar to that of overlay 36, the lamp being located substantially above the horizon-line 30 and preferably vertically above pivot 32.

Although not necessarily, diode 42 is preferably of a type which is sensitive primarily to infrared rays so that it will respond only to the light (or more properly heat) reflected from index 15, and not send false signals by reason of the impingement of daylight thereon. A filter 51 is contemplated to shield diode 42 from light as such and admit essentially infrared rays only to diode 42.

It will now be apparent that if the aircraft approaching a landing is coming in too low, index 15 will shift upwardly, starting the foregoing sequence of events so that lamp 48 will glow in full view of the pilot — who is properly watching small plate 26 — and apprising him of the fact that he is too low, and which he might not have noticed when concentrating on the indications of small plane 26. He does not have to take his eyes off of instrument 24, it being remembered that the ground is not visible, and that it is possible for anyone to become seriously disoriented under these conditions.

Lead 44 may contain two or more conductors, as necessary to answer the requirements of diode 42, and it is preferably incorporated in a cable 52 leading out of overlay 36 to amplifier 46 which may be located at any convenient point where it can be accomodated.

A power supply 54, which may be the plane's battery, or an independent battery or generator, as desired, supplies electric power through a lead 56 and switch 58 by means of which the device may be shut off when not needed. A lead 60 supplies power to amplifier 46, and lead 56 and 60 are incorporated in cable 52. Lead 56 has a branch 62 supplying lamp 40, and a similar lamp 64. Lamp 64 works with a photosensitive diode 66 in a manner similar to that described in connection with diode 42 except that the latter responds when index 15 moves down, and indicates by means of a lamp 68 located in overlay 50 below small plane 26 that the aircraft is too high. The impulse generated by diode 66 is transmitted to amplifier 46 by a lead 70 also incorporated in cable 52, and which, emerging from amplifier 46, continues to lamp 68.

In similar manner, light sources 72 and 74 in overlay 36 on either side of index 23 are supplied with power from hereinbefore mentioned lead 56 and are positioned to cooperate with diodes 76 and 78 to sense deflection of index 23 to the left or right, respectively, and which, through leads 80 and 82, and amplifier 46 activate lamps 84 and 86 in overlay 50 preferably on the horizontal diameter of overlay 50 and close to the outer margins thereof. Lighting of lamp 84 will indicate that the aircraft is off course to the right, while lighting of lamp 86 will indicate that the aircraft is off course to the left. The pilot therefore, while watching small plate 26 and keeping it apparently level in relation to horizon line 30, will be continuously informed as to whether he is on the desired flight path, and if not, which direction he should correct the course of the aircraft in order to regain it.

In brief he should steer toward whatever lamp is lighted.

Leads 44, 70, 80 and 82 leaving amplifier 46 are gathered into a cable 88 which leads to overlay 50 and the individual wires leading from the cables to the various lamps and diodes may be embedded in the overlay material, preferably transparent plastic, and they can be so fine as to be barely visible so as not to be distracting. In each case the separate leads have been depicted by a single line, but it is to be understood that they may consist of more than one conductor, and in fact as many as necessary to actuate or to receive impulses from the connected units.

Referring to FIG. 3, 94 is a modified instrument having external connections 96 and 98 to a coil 100 which actuates an index 15, traveling before a dial 103 and indicating deviations from a desired glide angle. Electrical energy is fed to coil 100 through leads 96 and 98 via leads 104 and 106 from a radio receiver-amplifier 109 in known manner. Similarly, leads 108 and 110 transmit energy through leads 112 and 114 to a coil 116 which actuates an index 118 corresponding to hereinbefore described localizer index 23. In known manner signals received by radio 108 will therefore cause shifting of indexes 102 and 118, indicating to the pilot whether he is on the proper glide path, and whether he is properly aligned with the runway. Leads 96 and 98 also extend to a multiple switch generally designated as 120 and continue when switch 120 is closed, into an amplifier 122 of known type from which a lead 124 connects with a lamp 126 associated with an instrument 128 similar to hereinbefore described instrument 24. Lamp 126 is arranged in an overlay 129 above the pivot 130 of a horizon-line bar 132 similar to horizon-line bar 30 in instrument 24.

In similar manner leads 112 and 114 extend into amplifier 122 but without passing through multiple switch 120, for a purpose which will be later described.

An impulse in leads 104 and 106 tending to raise index 102 will be converted in amplifier 122 in known manner into an impulse in lead 124 causing lamp 126 to flow and apprise the pilot that he is too low. In similar manner an impulse in leads 104 and 106 tending to cause index 102 to fall will be transformed in amplifier 122 into an impulse in a lead 134, causing a lamp 136, located below lamp 126 and preferably below pivot 130, to glow, indicating that the aircraft is too high.

In a similar manner an impulse in leads 108 and 110 tending to cause coil 116 to actuate index 118 toward the left will, through amplifier 122 and a lead 138, cause a lamp 140 located to the left of a small plane 141 to glow, indicating to the pilot that he is off course to the right, while, in a related manner, an impulse in leads 108 and 110 tending to shift index 118 to the right will, through a lead 142, cause a lamp 144, located to the right of small plane 141, to glow, indicating that the aircraft is off course to the left. Thus the pilot, as in the case of the embodiment of FIG. 1, may guide the plane by concentrating largely on instrument 128 without fear of deviating from a radio beam by reason of concentrating too intently on horizon-line 132 and small plane 141.

The invention is not limited to the transmission of information from a glide-slope and localizer instrument, but the principle may be applied to other instruments.

In FIG. 3, numeral 146 designates generally an altimeter having a dial 148, and crystal 149, a needle or index 150 rotating before the dial in known manner and indicating the altitude or height of the aircraft against legends 152. In the present embodiment an adjustable dial 154 is rotatably supported in front of dial 148 being adjustable by finger contact or otherwise, and being retained in place on a pivot 158 fixed on crystal 149. It may be turned so as to direct a pointer-extension 156 toward any desired legent 152. Extension 156 carries lamps or light sources 160 and 162 supplied with power in a manner similar to hereinbefore mentioned lamps 40, 62, 72 and 74, through a lead 163 and positioned to direct light toward pointer 150 at such times as the latter is located within range thereof. Also on extension 156 is a photosensitive diode or photocell 164 having a lead 166 extending through multiple switch 120 into amplifier 122. A similar photosensitive diode 168 circumferentially spaced from diode 164 has a lead 170, also leading into amplifier 122 through switch 120.

Pivot 158 is preferably made of a firm grade of soft rubber or rubber-like material, and dial 154 is retained thereon by a thumb-nut 171 made of softer material to minimize injury in case anyone is thrown against it.

Switch 120 has a knob or grip 172 which actuates sets of contacts 174 and 176, and which in the full line position closes contacts 174 to connect leads 96 and 98 with amplifier 122, while opening contacts 176 to break the connection of leads 166 and 170 with amplifier 122. In the dotted line position knob or actuator 172 closes contacts 176 and opens contacts 174. In this situation if index 150 rotates in a clockwise direction from the position shown in full lines, indicating that the aircraft is climbing, light from lamp 162 will be reflected from index 150 into photocell 168, causing it to send an impulse through lead 170 into amplifier 122. Known connections and elements in amplifier 122 will then send an impulse through hereinbefore mentioned lead 134 and cause lamp 136 to glow, indicating to the pilot that he is above his desired flight path. In similar manner, if index 150 moves in a counterclockwise direction, light from lamp 160 will be reflected into photosensitive diode 164, resulting in an impulse in lead 166, which will be transformed in amplifier 122 into an impulse in lead 124, lighting lamp 126, and indicating to the pilot that he is below the desired flight path. In this manner, when no radio beam is available the pilot can maintain a desired altitude without taking his eyes off of horizon-line 132. Such operation would be useful in cross country flying when the ground is not visible.

Dial 154 may be set by hand at any desired altitude, and when the plane approaches the set altitude light 126 or light 136 will glow. When the exact altitude is reached whichever light was lighted will go out. As long as the set altitude is maintained neither light 126 nor light 136 will be activated, but as soon as any change in altitude takes place, one or the other light will glow, as above described. By operating switch 120 the indications of either instrument 94 or 146 may be transferred to and juxtaposed on instrument 128, and it is contemplated that indications of other instruments may be superposed on instrument 128, within the scope of the invention, such, for example, as the wellknown rate-of-climb indicator.

Inasmuch as dial 154 does not obscure index 150 nor legends 152 of instrument 146, dial 154 is not required to be of transparent material, but may be if desired.

An adjustment of known type 178 is incorporated in radio 108 to provide for tuning to various wave-lengths so that any available radio signal may be utilized, and adjustments 180 and 182 of known type are incorporated in amplifier 122 for adjusting the degree of response to instruments 94 and 146 respectively.

Since leads 112 and 114 from coil 116 in instrument 94 bypass multiple switch 120, indications of index 118 showing deviations of the aircraft to the right or left of a radio beam continue to be transferred to instrument or attitude indicator 128 even when altimeter 146 is being used, so that the aircraft may be guided by any available radio beam in cross country flying. The device is therefore useful not only when following a landing beam, but also under any conditions when the ground is not visible, and it relieves the pilot of the strain of trying to continuously monitor two or more spaced instruments under trying conditions.

The operation of the device is thought to be clear from the foregoing, but to summarize, the device disclosed in FIG. 1 is installed by securing overlays 36 and 50 in juxtaposed relation to the dial portions of instruments 4 and 24 and finding a place for amplifier 46. Then, when conditions require its use, switch 58 is closed, lighting lamps 40, 64, 72 and 74. The aircraft is brought onto the radio landing beam in the usual or any desired manner, whereupon indexer 15 and 23 will shift so as to indicate whether the craft is high, low or off the beam to the left or right. Also horizon-line 30 in relation to small plane 26 will indicate whether or not the wings are level. As the final phase of the landing is approached it is necessary to concentrate on the indications of small plane 26. If the aircraft deviates from the beam this will be indicated immediately by deflection of index 15 or index 23 or both but, so that such indication cannot be missed by the pilot concentrating on small plane 26, one or another, or possibly two of the several lamps in overlay 50 will light up, thus apprising the pilot that he needs to correct his course, and in what direction. It is also contemplated that diodes 42, 66, 76 and 78 may be of a type which will graduate their output in accordance with the amount of light falling on them so that the intensity of the current resulting will be proportional to the amount of deviation of needles 8 and 18. In this way the brilliance of the lights 48, 68, 84 and 86 will indicate not only the direction of the error, but also the degree thereof.

Adjustments 90 and 92 may be used to control the degree of response of the lamps in overlay 50 as may be desirable.

The operation of the embodiment of FIG. 3 is generally similar, deviations of indexes 102 and 118 being indicated by glowing of lights 126, 136, 140 and 144 superposed on attitude indicator 128 with switch 120 in one position, thus facilitating the following of a radio landing beam. With switch 120 in the other position and dial 154 of altimeter 146 set on a desired altitude, any deviation from such desired altitude will be indicated by glowing of light 126 or 136 in accordance with the direction of the deviation.

During such operation indexes 102 and 118 will still be active, although the deviations of index 102 will not be transmitted to lights 126 and 136. However, deviations of index 118 will continue to be transmitted to lights 140 and 144 by reason of the fact that multiple switch 120 is bypassed by leads 112 and 114 and does not affect their transmission of impulses through amplifier 122 to lamps 140 and 144. It is therefore relatively easy to follow a radio beam across country, if one is available, even under conditions when it is necessary to concentrate utterly on the attitude indicator, and without fear of drifting away from the desired or prescribed altitude.

Variations, modifications and improvements of the device are contemplated, and it is anticipated that others working in this field may make variations and modifications on the disclosed device, and it is to be understood that all such variations, modifications and improvements are to be considered as part of the invention, insofar as they are covered by the following claims.

What is claimed as new and desired to be secured by Letters Patent of the United States is:

1. For use on an instrument panel having first and second spaced instruments which give off observable indications from the front faces thereof at said instrument panel, means providing for consolidating the indications from both instruments to provide for observation thereof by visual orientation at only one of the instruments, said means comprising, in combination: a first substantially transparent overlay with means for mounting the same over at least a portion of the front face of said first instrument and through which the face of the first instrument may be observed, a second substantially transparent overlay with means for mounting the same over at least a portion of the front face of said second instrument and through which the face of the second instrument may be observed, electrical connections between the first overlay and the second overlay to be activated in accordance with indications picked up by the first overlay from the face of said first instrument, said electrical connections extending to said second overlay, and said second overlay constituting an indicating unit responsive to the activation of said electrical connections to indicate at said second instrument the indications of said first instrument.

2. The combination of claim 1 wherein said second overlay is of sufficient thickness to contain light emitting sources responsive to activation of said electrical connections.

3. The combination of claim 1 wherein said first overlay constitutes a pick-up unit having at least one light sensitive element in said electrical connections for picking up light emitted indications from said first instrument.

4. The combination of claim 3 wherein said second overlay is of sufficient thickness to contain light emitting sources responsive to activation of said electrical connections.

5. The combination of claim 3 wherein said indicating unit has a lamp spaced in front of the second instrument, and an electrical connection between said light sensitive element and said lamp to activate the lamp in response to activating the light sensitive element.

6. In combination, a plurality of spaced observable instruments a first of which comprises an altimeter having a movable index, a pointer manually adjustable in a path substantially parallel to that of said index, a light source on said pointer positioned to project light onto said index, a pair of photocells on said pointer spaced, in one position of said index, on opposite sides thereof, each of said photocells being positioned to receive light reflected from said index upon deviation of said index from said one position in one direction; an indicating unit comprising an overlay supported in front of another of said spaced instruments to be observed simultaneously with said other instrument, including a plurality of lamps spaced about said other instrument and carried by said overlay; and electrical connections from said first instrument to said indicating unit and activated in accordance with indications of said first instrument to cause said first instrument to furnish indications to said indicating unit in accordance with indications of said first instrument, said electrical connections extending each from one of said photocells to one of said lamps, and the last mentioned lamps being positioned to indicate, when lighted, the direction of deviation of said index.

7. In combination, a plurality of spaced observable instruments, a first of which comprises a glide-slope and locator instrument having a vertically movable glide-slope index and a horizontally movable locator index, an actuating element for said glide-slope index, an actuating element for said locator index, and an altimeter having a movable index; an indicating unit comprising an overlay supported in front of another of said spaced instruments to be observed simultaneously with said other instrument, including a plurality of lamps spaced about said other instrument and carried by said overlay; and electrical connections from said first instrument to said indicating unit and activated in accordance with indications of said first instrument to cause said first instrument to furnish indications to said indicating unit in accordance with indications of said first instrument, said electrical connections including connections extending from said locator actuating element to said indicating unit, switching means, connections from the glide-slope index actuating element to said switching means, connections from said altimeter to said switching means, and connections from said switching means to said indicating unit, said switching means being constituted to selectively transmit indications of said glide-slope index and said altimeter to said indicating unit.

8. In combination, a plurality of spaced observable instruments, a first of which comprises a glide-slope and localizer indicator having a movable index and a second of which comprises an attitude indicator; a light source positioned to project light in a direction to be intercepted by said movable index of said first instrument; a photocell positioned to receive light reflected from said index, in one position of said index; an indicating unit comprising a transparent overlay juxtaposed with said second instrument to be observed simultaneously therewith and carrying a plurality of lamps spaced about said second instrument; electrical connections from said photocell to said indicating unit constituted to actuate said indicating unit to provide indications coincident with indications of said second instrument but in accordance with movements of said movable index in the first mentioned instrument; and wherein said glide-slope and localizer indicator has a vertically movable glide-slope index having a normal position, and a horizontally movable localizer index having a normal position, with said light source positioned to project light onto each of said indexes; including spaced photocells, one positioned to receive light reflected from said glide-slope index upon deviation of said index from its normal position in one direction, and another positioned to receive light reflected from said glide-slope index upon deviation of said index in the other direction; electrical connections from said photocells each to one of vertically spaced lamps on said overlay; other spaced photocells, one positioned to receive light reflected from said localizer index upon deviation of said index from its normal position in one direction, and another positioned to receive light reflected from said localizer index upon deviation of said localizer index in the other direction; and connections from the last mentioned photocells each to one of horizontally spaced lamps on said overlay.

* * * * *